(12) United States Patent
Fan

(10) Patent No.: US 7,752,389 B1
(45) Date of Patent: Jul. 6, 2010

(54) TECHNIQUES FOR DETERMINING PHYSICAL DATA LAYOUT OF RAID DEVICES

(75) Inventor: Qun Fan, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 563 days.

(21) Appl. No.: 11/820,737

(22) Filed: Jun. 20, 2007

(51) Int. Cl.
*G06F 12/00* (2006.01)
(52) U.S. Cl. .............................. 711/114; 711/E12.078
(58) Field of Classification Search ........................ None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek et al. | |

*Primary Examiner*—Reginald G Bragdon
*Assistant Examiner*—Aracelis Ruiz
(74) *Attorney, Agent, or Firm*—Muirhead and Saturnelli, LLC

(57) ABSTRACT

Described are techniques for determining where to store data and parity information in a RAID group for a data track having a track number. A stripe number is provided. A first member identifier is determined which identifies a RAID group member at which data information of said data track is stored. A second member identifier of a second member of said RAID group is determined to store a first set of parity information for said data track. A third member identifier of a third member of said RAID group is determined to store a last set of parity information for said data track. It is determined whether the third member identifier is less than the second member identifier. If the third member identifier is less than said second member identifier, the first member identifier is updated. Also described are techniques for determining a track identifier of a data track stored at a location in a RAID group.

20 Claims, 12 Drawing Sheets

TECHNIQUES FOR DETERMINING PHYSICAL DATA LAYOUT OF RAID DEVICES

BACKGROUND

1. Technical Field

This application generally relates to data storage, and more particularly to techniques used in connection with determining a data layout for RAID devices.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Existing data storage systems may utilize different techniques in connection with providing fault tolerant data storage systems, for example, in the event of a data storage device failure. There are a number of different RAID (Redundant Array of Independent or Inexpensive Disks) levels and techniques that may be used in connection with providing a combination of fault tolerance and/or improved performance for data storage devices. For example, RAID-5 techniques can be used in connection with a data storage system to protect from a single device failure with block level striping and distributed parity information, and RAID-6 provides protection from two devices of the RAID group failing with two sets of distributed parity and block level striping.

In connection with RAID device groups, different techniques may be used to determine on what RAID group members to store the data and parity information. In other words, different techniques may be used in connection with striping the data and parity information across RAID group members. It may be desirable to have a technique which is flexible and can be used with different RAID levels. It may also be desirable to have a technique which can be used with varying numbers of total RAID group members, and varying numbers of data and parity members.

SUMMARY OF THE INVENTION

In accordance with one aspect of the invention is a method for determining where to store data and parity information in a RAID group for a data track having a track number comprising: providing a stripe number including said data track, said stripe number corresponding to a row of segments written to members of said RAID group, said row of information including data and parity information, each of said members of said RAID group associated with a different member identifier; determining a first member identifier of a first member of said RAID group as a quotient of two elements, a first of said two elements being a remainder of said track number divided by said number of tracks in each stripe and said second of said two elements being a size of each of said segments, said first member identifying a RAID group member at which data information of said data track is stored; determining a second member identifier of a second member of said RAID group to store a first set of parity information for said data track, said second member identifier determined as a remainder of said stripe number divided by a number of members in said RAID group; determining a third member identifier of a third member of said RAID group to store a last set of parity information for said data track, said third member identifier being determined as a remainder of a sum divided by said number of members in said RAID group, said sum is a result of said second member and a number of parity members in said RAID group minus a value of one; determining whether said third member identifier is less than said second member identifier; and if said third member identifier is less than said second member identifier, updating said first member identifier to be a sum of a current value of said first member identifier, said third member identifier, and a value of one. If the third member is not less than said second member, the method may also include: determining whether said first member identifier is greater than or equal to said second member identifier; and if said first member identifier is greater than or equal to said second member identifier, updating said first member identifier to be a sum of a current value of said first member identifier and said number of parity members in said RAID group. The stripe number may be determined as a quotient of said track number divided by a number of tracks in each stripe. The RAID group may include "m" parity members, m>1, and the method may include: storing a first set of parity information for said data track on said second member; and storing a last set of parity information for said data track on said third member. If m>2, the method may include storing other parity information for said data track on members having an associated member number which is between said second member and said third member. The RAID group may include 1 parity member and said second member identifier is equal to said third member identifier. If the third member identifier is less than said second member identifier and the number of parity members in the RAID group is more than 1, parity information for said data track may be stored on a last member of said RAID group having a highest value of all member identifiers associated with the members of the RAID group, and other parity information may be stored on another member of said RAID group have a smallest value of all said member identifiers. The method may also include providing a cylinder number and head number associated with a data storage device; and determining said track number for said cylinder number and head number.

In accordance with another aspect of the invention is a method for determining a track identifier of a data track stored at a location in a RAID group comprising: providing said location, said location including a member identifier identifying a member drive of said RAID group and a stripe number, each of said members of said RAID group associated with a different member identifier, said stripe number corresponding to a row of segments written to members of said RAID group, said row of information including data and parity information; determining a first member identifier of a first member of said RAID group at which a first set of parity information for said data track is stored, said first member identifier determined as a remainder of said stripe number divided by a number of members in said RAID group; determining a second member identifier of a second member of said RAID group at which a last set of parity information for said data track is stored, said second member identifier being determined as a remainder of a first quantity divided by said number of members in said RAID group, said first quantity is a result of said first member identifier and a number of parity members in said RAID group minus a value of one; determining whether the second member identifier is less than said first member identifier; providing said track identifier initialized to said member identifier; if said second member identifier is less than said first member identifier, updating said track identifier as said member identifier minus a sum of said second member identifier and a value of one; and updating said track identifier as a sum of elements, said elements including a first element as a product of said stripe number and a number of data tracks in each row of segments written to members of said RAID group, and a second element as said track identifier adjusted for a size of each of said segments. If the second member identifier is not less than said first member identifier, the method may further comprise performing, prior to said updating said track identifier as a sum of elements: determining whether said member identifier is greater than or equal to said first member identifier and, if so, updating said track identifier as said member identifier minus a number of parity members in said RAID group. The sum of elements may include a third element determined as a remainder of a current value of said track identifier divided by a number of tracks in each of said segments. The method may also include determining whether said data track is stored on a member of said RAID group including parity information and, if so, updating said track identifier to identify a default data track included in a data segment of said stripe number. The stripe number may be determined as a quotient of a slice number and a number of slices in each row of segments written members of said RAID group, each slice corresponding to one or more tracks of a data storage device. The method may include determining a cylinder number and head number associated with a data storage device for said track identifier.

In accordance with another aspect of the invention is a computer readable medium comprising executable code stored thereon for determining where to store data and parity information in a RAID group for a data track having a track number, the computer readable medium comprising executable code for: providing a stripe number including said data track, said stripe number corresponding to a row of segments written to members of said RAID group, said row of information including data and parity information, each of said members of said RAID group associated with a different member identifier; determining a first member identifier of a first member of said RAID group as a quotient of two elements, a first of said two elements being a remainder of said track number divided by said number of tracks in each stripe and said second of said two elements being a size of each of said segments, said first member identifying a RAID group member at which data information of said data track is stored; determining a second member identifier of a second member of said RAID group to store a first set of parity information for said data track, said second member identifier determined as a remainder of said stripe number divided by a number of members in said RAID group; determining a third member identifier of a third member of said RAID group to store a last set of parity information for said data track, said third member identifier being determined as a remainder of a sum divided by said number of members in said RAID group, said sum is a result of said second member and a number of parity members in said RAID group minus a value of one; determining whether said third member identifier is less than said second member identifier; and if said third member identifier is less than said second member identifier, updating said first member identifier to be a sum of a current value of said first member identifier, said third member identifier, and a value of one. The computer readable medium may further comprising executable code that, if said third member is not less than said second member: determines whether said first member identifier is greater than or equal to said second member identifier; and if said first member identifier is greater than or equal to said second member identifier, updates said first member identifier to be a sum of a current value of said first member identifier and said number of parity members in said RAID group. The stripe number may be determined as a quotient of said track number divided by a number of tracks in each stripe. The RAID group may include "m" parity members, m>1, and the computer readable medium may further include executable code for: storing a first set of parity information for said data track on said second member; and storing a last set of parity information for said data track on said third member. The computer readable medium may further comprise executable code that, if m>2, stores other parity information for said data track on members having an associated member number which is between said second member and said third member. The RAID group may include 1 parity member and the second member identifier may be equal to the third member identifier.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
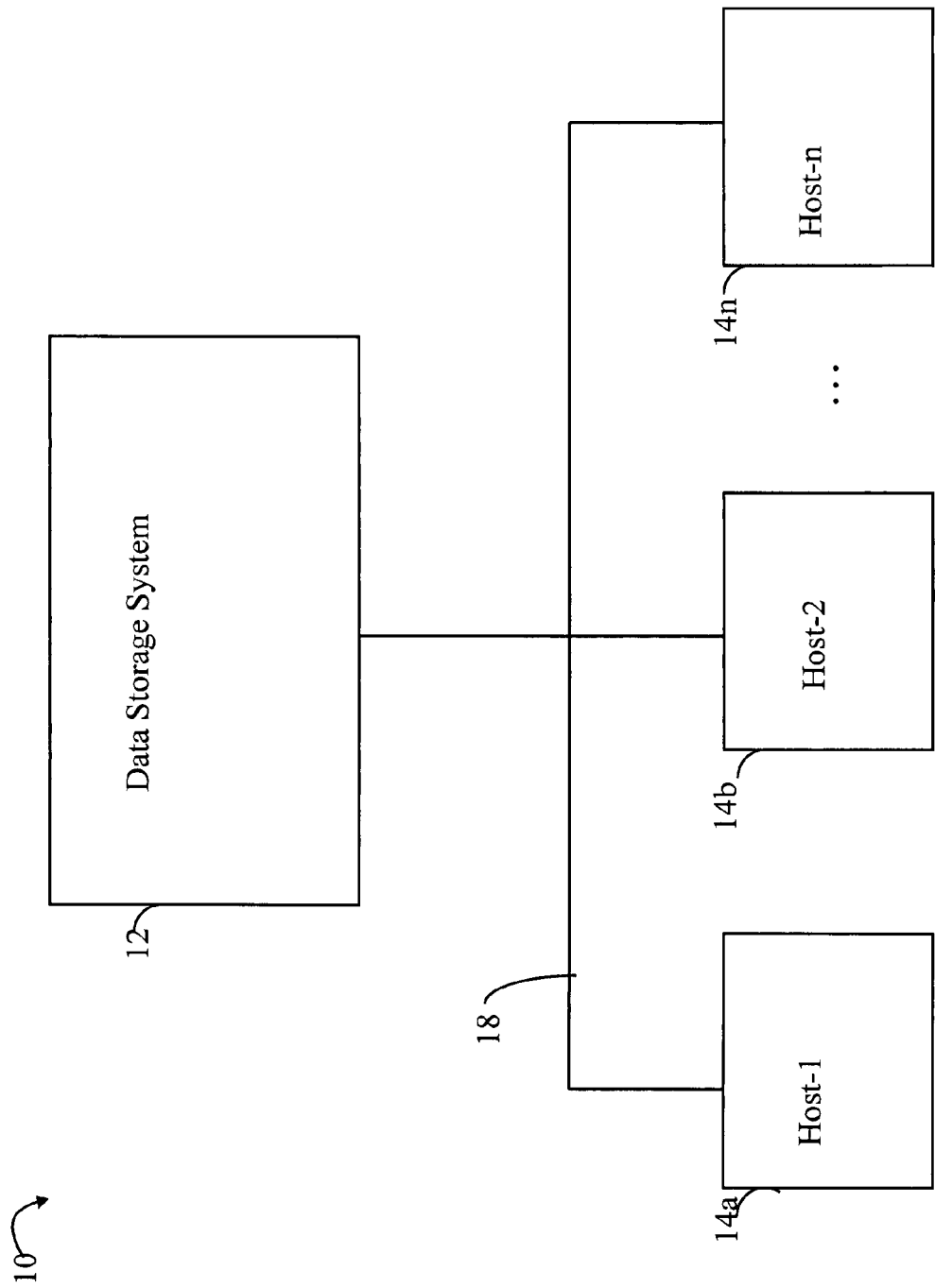
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
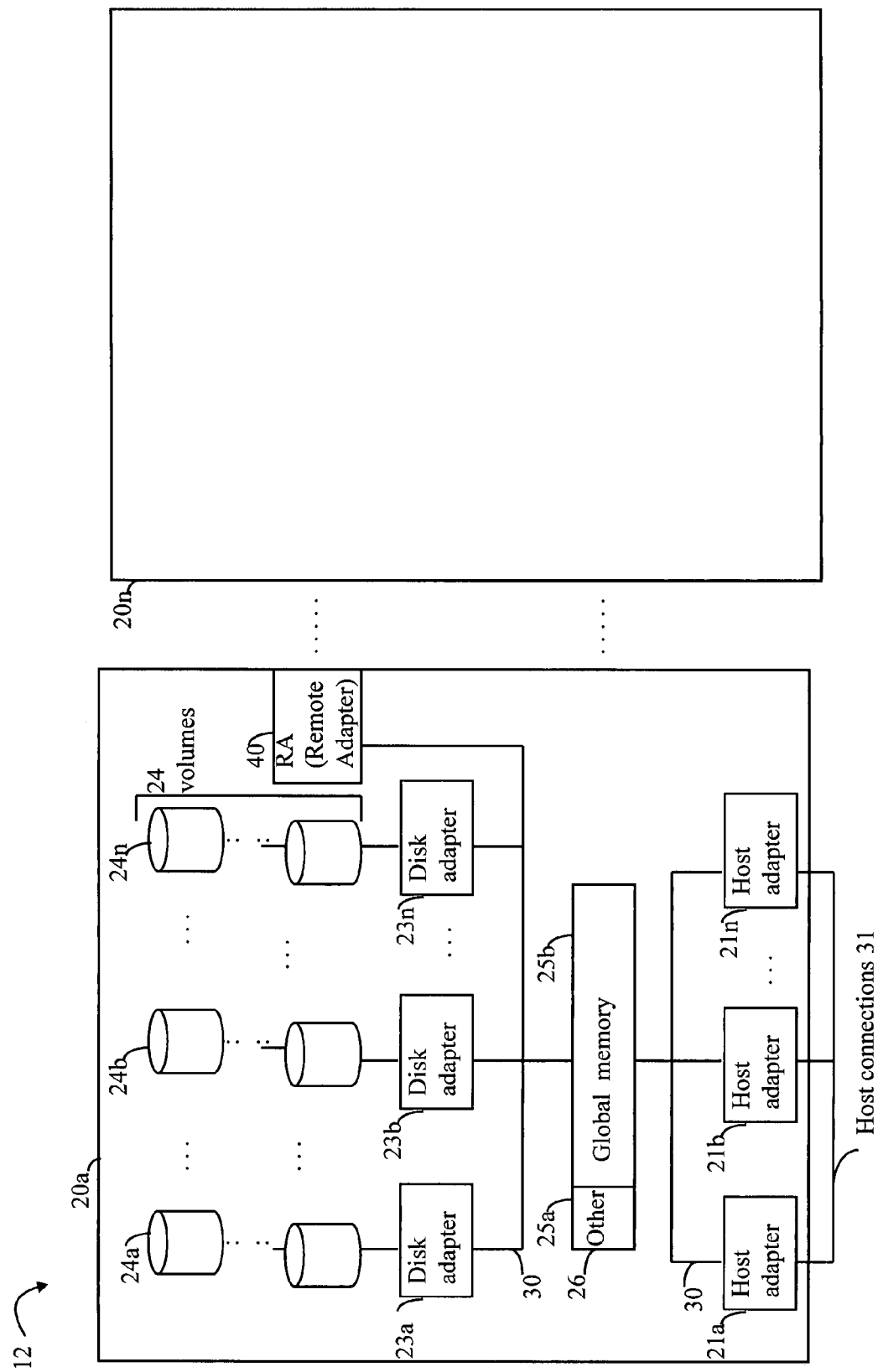
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
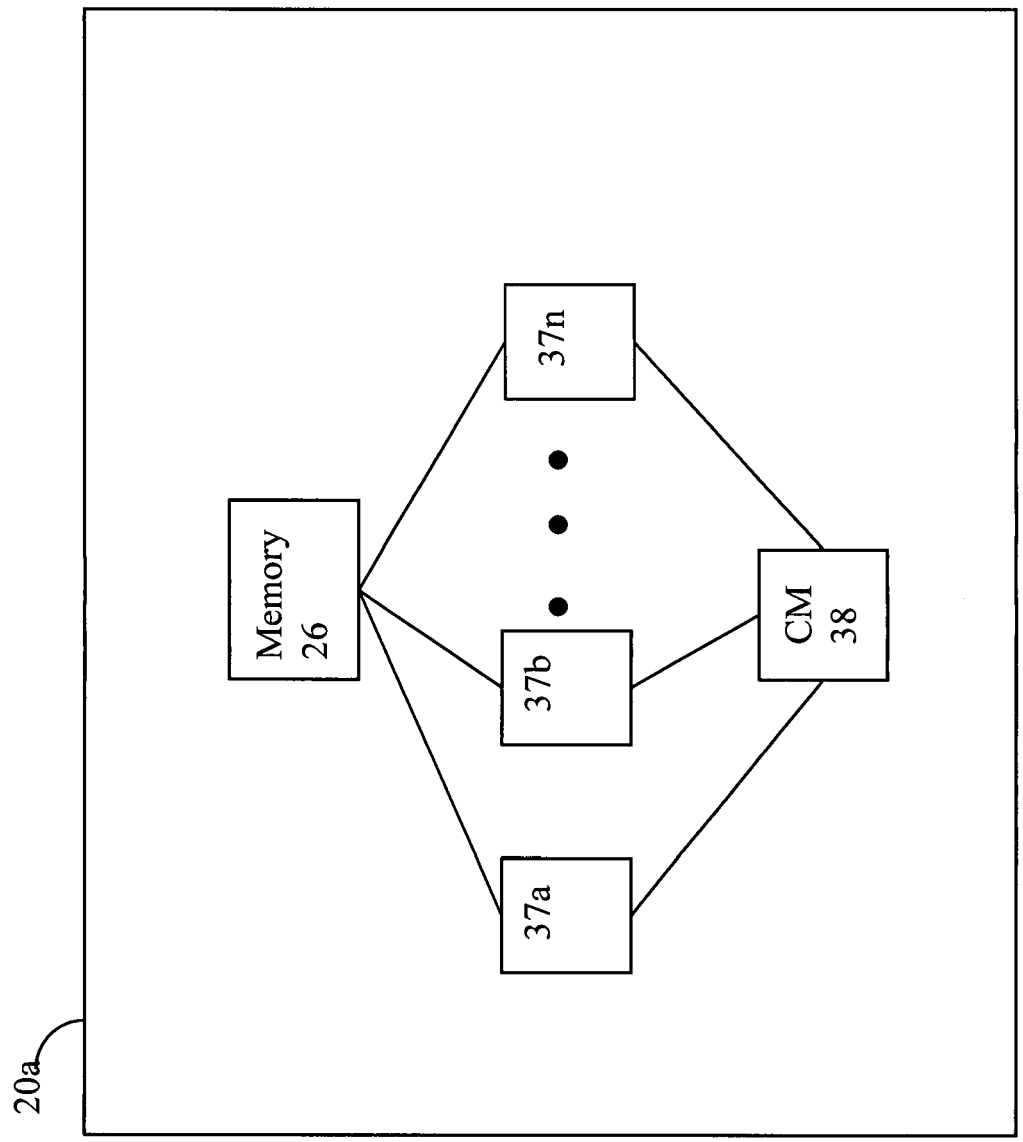
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As known to those of ordinary skill in the art, different techniques may be used in connection with providing fault tolerant data storage systems. There are a number of different RAID (Redundant Array of Independent or Inexpensive Disks) levels that may be used in connection with providing a combination of fault tolerance and/or improved performance for data storage devices. Different RAID levels (e.g., RAID-1, RAID-5, RAID-6, and the like) may provide varying degrees of fault tolerance. For example, RAID-5 techniques may be used in connection with providing protection in the event of a single device failure within a RAID group. Information is stored in connection with a RAID-5 implementation which allows a data storage system to rebuild or recover the data on the single failed device within a RAID group. However, RAID-5 techniques do not provide protection for two independent devices failures within a RAID group, as may occur, for example, in the event of a second device failure during a rebuild/recovery phase of a first failed device. RAID-6 techniques may be used in a data storage system to provide for such data protection in the event of two independent device failures in a device grouping.

In connection with RAID groups of devices such as disk drives, different RAID techniques may provide for rebuilding of failed devices by encoding parity information formed from the data members of the RAID group. Depending on the RAID level and technique used, an embodiment may encode one more parity members formed using a variety of different ways. For example, an embodiment utilizing RAID-6 may have a double parity scheme. For N data devices or drives, two parity devices are used. The RAID group may include N+2 members or drives. A first parity drive, referred to as the horizontal parity drive, and a second parity drive, referred to as a diagonal parity drive, may be utilized in connection with a data unit grouping of size N−1 to encode parity information thereon of the N data drives. Parity information may be determined utilizing the XOR (exclusive-OR) logical operation. However, it should be noted that the parity information utilized in connection with the techniques described herein may be determined using other operations and processing steps as known to those of ordinary skill in the art. XOR may be selected in an embodiment because, for example, due to the efficiency of performing such an operation. The values associated with the XOR logical operation of the contributing data members are used in determining the correct parity values.

What will be described in following paragraphs are techniques that may be used to determine the physical layout of data on RAID group devices for a given RAID group size (e.g., number of members or drives) consisting of a number of data members and a number of parity members. The techniques herein may be used in connection with any one of a variety of different RAID levels and RAID group configurations.

Figure 3:
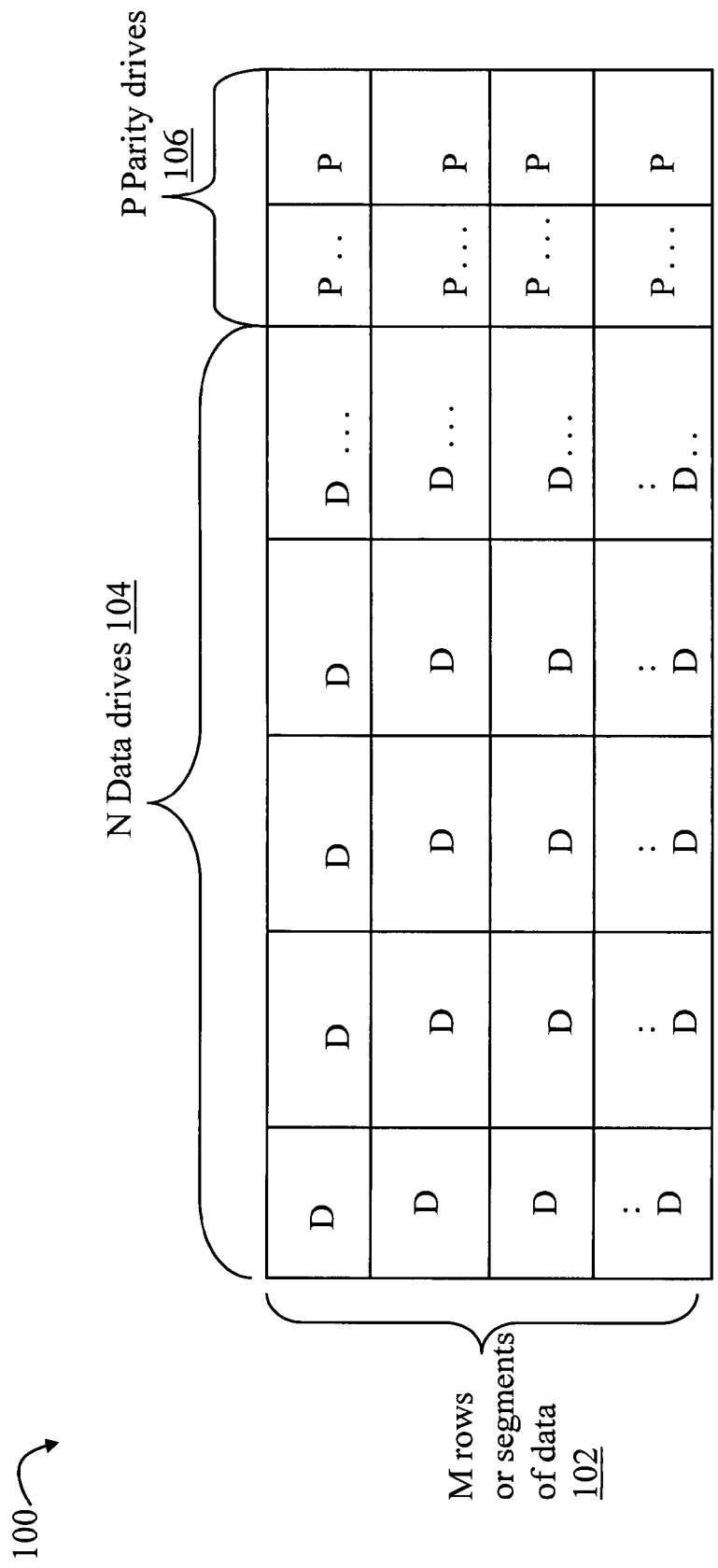
FIGS. 3, 3A, 3B, 4, and 5 are example representation of data stored on member drives of a RAID group.

Referring to FIG. 3, shown is an illustration 100 of the data segments of each data drive and the one or more parity drives as may be used in connection with the techniques described herein. It should be noted that the particular values used herein for sizes, dimensions, and the like, are selected for the purposes of example and illustration and should not be construed as a limitation of the techniques. The example 100 includes N data drives. Each data drive is represented as a column of M data segments. Each data segment corresponds to an element within a particular column. The example 100 also includes P parity drives, P being greater than or equal to 1. N, the number of data drives, may generally be greater than or equal to the number of parity drives, P, with any RAID level (e.g., RAID-0, 1, 2, 3, 4, 5, 6, and the like) in connection with the techniques herein. The particular relationships between data segments (represented as "D" segments or elements in 100) and the parity segments (denoted "P") may vary with each particular RAID implementation using the techniques herein. For example, an embodiment may use a RAID-6 technique as described in U.S. patent application Ser. No. 11/167,704, filed Jun. 27, 2005, Fan, et al., TECHNIQUES FOR FAULT TOLERANT DATA STORAGE, now U.S. Pat. No. 7,577,866, which is incorporated by reference herein, or the technique described in "EVEN-ODD: An Efficient Scheme for Tolerating Double Disk Failures in RAID Architectures", IEEE Transactions on Computers, Vol. 44, No. 2, February 1995, by Blaum et al., as well as other techniques for RAID-6 and other RAID levels known in the art.

The example 100 illustrates the data portions D and corresponding parity information portions P as operated upon and generated using a RAID technique as described above. In one embodiment, the data in the example 100 may represent data included in a single "slice" of data. A slice of data may be defined as the data included in a same row that is striped across all the member drives in the RAID group. In one embodiment, the striping unit size or width of a slice is 1 track. The data included in a slice having N+P RAID group members corresponds to the N+P tracks written to each RAID group member included in a single row. In this example, the RAID technique generating the parity information may operate on portions of a track in which each portion is denoted by a "D" or "P" in FIG. 3. The RAID technique may operate on a portion of a track or other unit of storage. As will be described in following paragraphs, the layout techniques described herein may operate on data segments in which each data segment may correspond to a track or all data in a single column of FIG. 3.

Figure 3A:
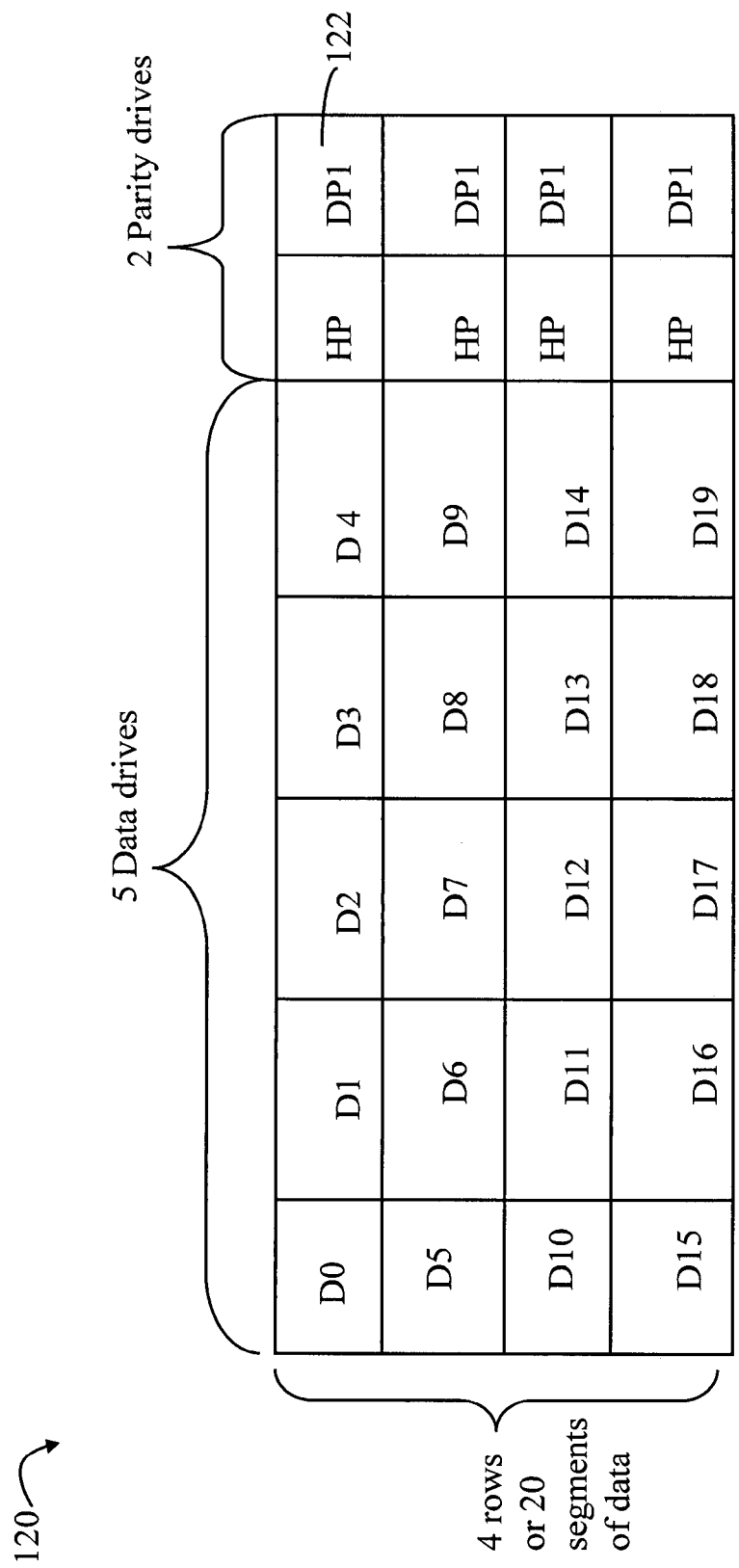

Referring now to FIG. 3A, shown is an example representation of a RAID-6 technique configuration that may be used in connection with the techniques herein. The example 120 includes 5 data drives and 2 parity drives. The example 120 includes 2 parity drives denoting horizontal parity (HP) segments and diagonal parity (DP) segments. The particular relationships between data segments (represented as "D" segments or elements in 100) and DP and HP segments may vary with each particular RAID implementation using the techniques herein. For example, an embodiment may use a RAID-6 technique as described in "EVEN-ODD: An Efficient Scheme for Tolerating Double Disk Failures in RAID Architectures", IEEE Transactions on Computers, Vol. 44, No. 2, February 1995, by Blaum et al., where the HP of a row is based on the logical XOR of each data segment in the row. Each element denoting diagonal parity may be computed based on diagonal parity redundancy of different data segments. For example, in accordance with the EVEN-ODD technique, DP1 denoted by element 122 is based on the parity determined by logically XORing D0, D9, D13 and D17 and the parity of a special diagonal parity, S. S is a special diagonal parity formed by logically XORing D16, D12, D8 and D4.

Using techniques described herein, the physical layout of where to store the different data and parity information (e.g., such as illustrated in FIGS. 3 and 3A) on the different RAID group members may be determined.

It should be noted that each cell or element in the arrangements described herein, for example, as in connection with FIG. 3, may correspond to a symbol of information. The size of a symbol in an embodiment may vary. For purposes of illustration and example, the size may be a single bit. However, the actual symbol size utilized in an embodiment may vary. For example, in one embodiment in which a column of the arrangement corresponds to a stand alone physical storage device such as a disk, a symbol may correspond to data on a single disk sector or other data partitioning scheme that may be used in an embodiment.

As known in the art, all the segments in the example 100, and also example 120 of FIG. 3A, may collectively represent information included in a single slice or stripe of data of a logical device or volume (e.g., LV) that is striped or distributed across RAID group data members. The data segments D and the segments of parity information (denoted HP and DP) of FIG. 3A may be included in a same single slice or stripe. Each slice may correspond to a track or some other partitioned unit of storage. For purposes of illustration in this example, a slice or stripe may correspond to a track of data or some other configurable size or stripe unit referring to the size of the portions written to each disk or RAID group member. With respect to FIGS. 3 and 3A, the size of each segment (data Dn or parity HP or DP) may correspond to a portion of a track as operated upon by the underlying RAID technique. With respect to FIG. 3A, each segment may have a size which is ¼ of a track, and the stripe unit size of a slice or stripe representing the amount of data stored on each data member of the same slice or stripe is 1 track.

Figure 3B:
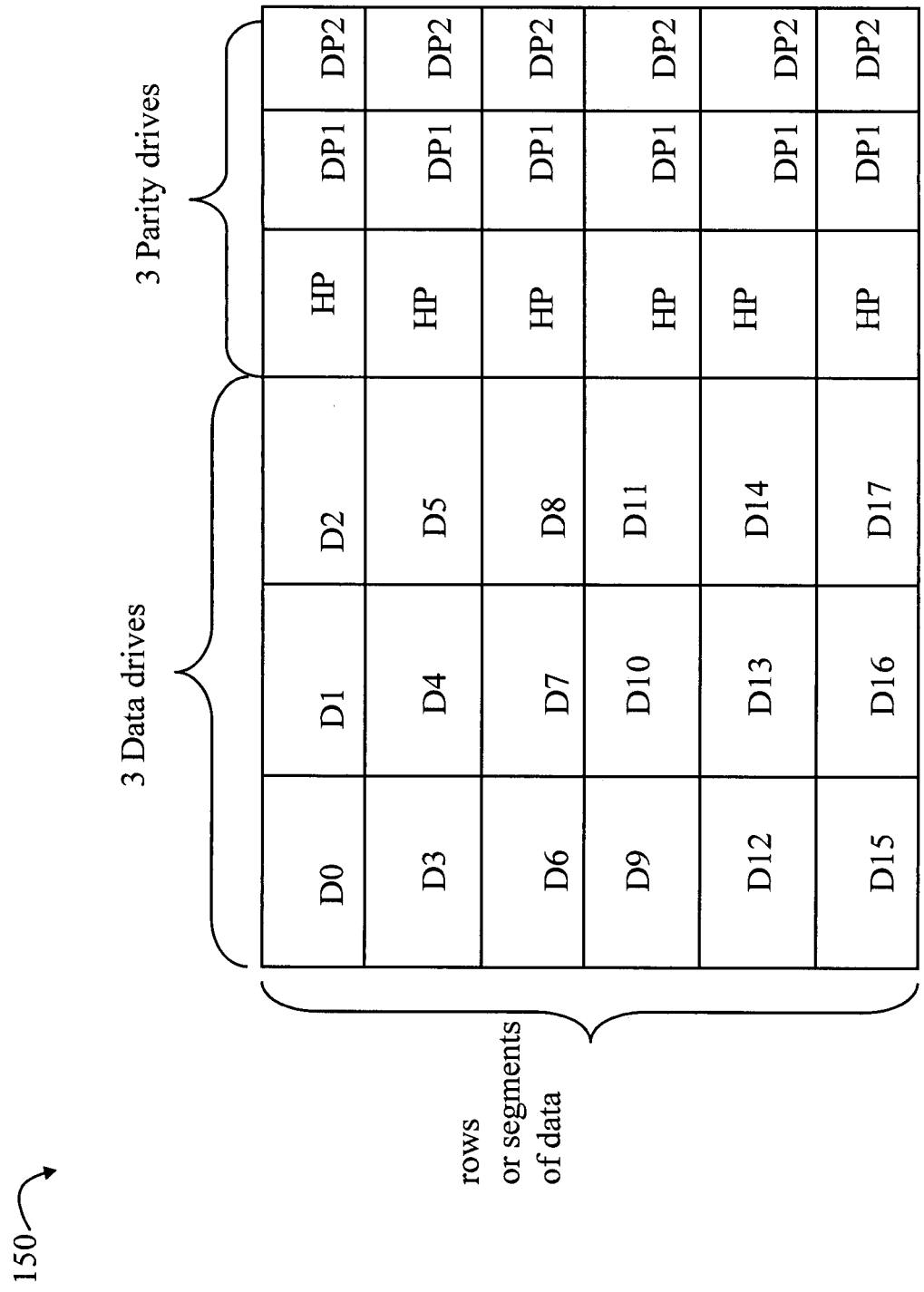

Referring now to FIG. 3B, shown is another example representing a RAID-6 configuration that may be used in connection with the techniques herein. The example of FIG. 3B may correspond to a RAID configuration having 3 data members or drives and 3 parity members or drives. The example of 150 will be used in connection with the techniques herein to illustrate how to determine where to physically store each of the segments of data and parity information. Each HP of a row of data segments may represent the horizontal parity information formed by logically XORing all data segments in the row. Each DP1 and DP2 may correspond to diagonal parity formed using any encoding technique from the data segments D0 . . . D17.

The layout technique described in following paragraphs in connection with, for example, FIGS. 3B, 4, 5, 6, 7 and 8, operates on data segments having a size or stripe unit such as a single track. In other words, a single segment (e.g., Dn, HP, DP1 or DP2) of FIG. 3B corresponds collectively to all data segments included in a single column of FIGS. 3 and 3A. For example, D0 of FIG. 3B corresponds to a portion of data as operated on by the layout technique. D0 may be a track of data and correspond to multiple data segments or portions operated upon by the underlying RAID technique. D0 of FIG. 3B may contain, for example, portions D0, D5, D10, and D15 of FIG. 3A in which D0 of FIG. 3B has a stripe unit or size as used in connection with the data layout technique described herein of 1 track, and in which portions D0, D5, D10, and D15 of FIG. 3A each correspond to portions as utilized in connection with the RAID technique generating the parity information. Each row of information included in FIG. 3B may correspond to a slice or stripe of information as illustrated collectively by all segments in FIG. 3A.

As will be appreciated by those skilled in the art, the configuration of FIG. 3B is only one such RAID grouping configuration for a RAID-6 technique that may be used in connection with the techniques herein which are more generally applicable to any RAID level and configuration having one or more data members and one or more parity members.

It should be noted that if an embodiment uses a particular RAID technique, such as the EVEN-ODD technique, the number of data drive members may vary with the number of rows. For example, with the EVEN-ODD algorithm, the number of data drives is 1 more than the number of rows. With reference to FIG. 3B, an embodiment having 6 rows or stripes as illustrated would have 7 data drive members to the RAID group with 2 parity drive members For purposes of illustration, each segment (e.g., data (D) and parity (HP, DP1 and DP2) segments) may correspond to a single track although actual implementations may vary the size of each segment utilized in connection with the layout techniques described herein.

Figure 4:
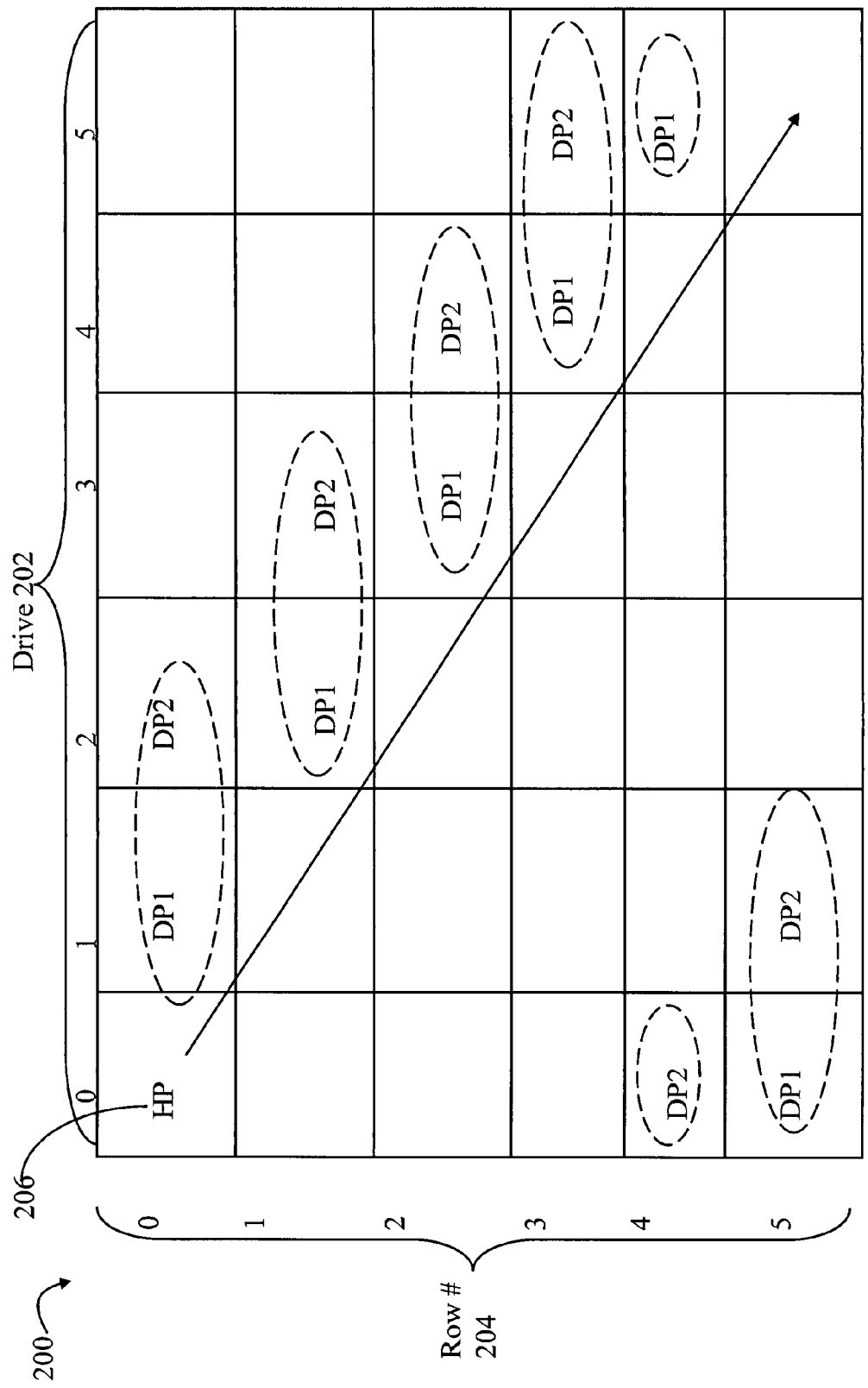

Referring now to FIG. 4, shown is an example illustrating how the techniques herein may be used to determine a physical location of the parity information striped or distributed across RAID group data members. The example 200 illustrates how the parity information, HP, DP1 and DP2, for each row or stripe may be stored on the RAID group members. In the example 200, each column 202 corresponds to a RAID group member drive across which a row 204 of data and parity information is striped. The particular drive members at which the parity and data information is stored may be determined using the techniques described in following paragraphs. In other words, the example 200 represents the arrangement or layout resulting from performing the techniques herein. Prior to describing the layout technique in algorithmic form, the resulting arrangement is described for the RAID group configuration (3 data members and 3 parity members) of FIG. 3B. The drives 202 and row numbers 204 are zero-based and referenced in following paragraphs using the zero-based notation.

Figure 5:
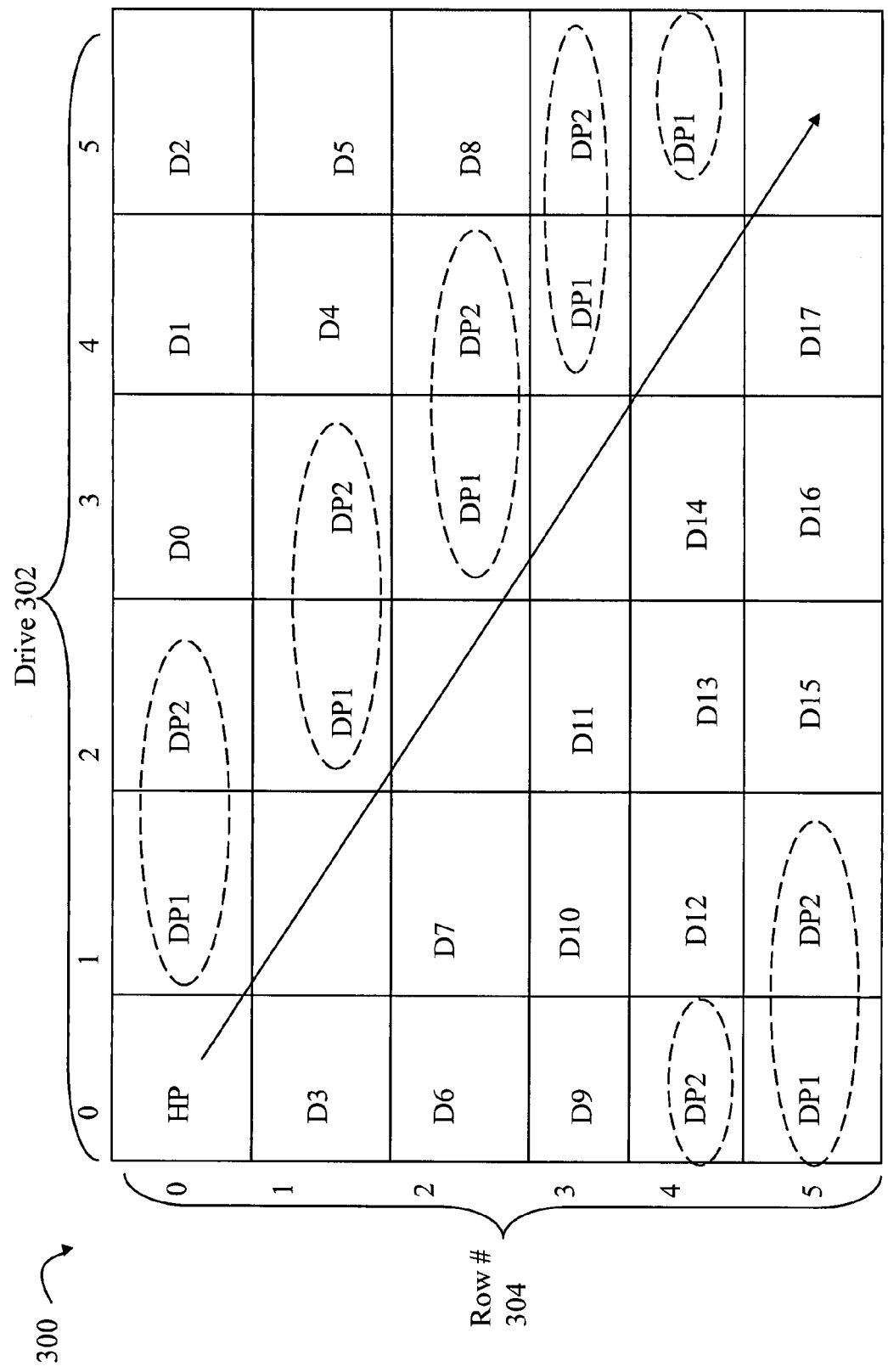

The example 200 includes the HP for a row of data segments stored on the diagonals of the configuration with a location denoted Row #, Drive #. For example, HP for row 0 is stored at location 0,0, the HP for row 1 is stored at location 1,1, and so on. Following the HP segment of each row are the two parity segments, DP1 and DP2, included in a given row. It should be noted that the storing of the parity information wraps around or starts over with the first drive member. In other words, the data layout techniques herein view the RAID group members 0 . . . 5 as wrapping around so that when storing the 3 parity members included in a row consecutively, the layout resumes storing data at member 0 when a previous parity segment is stored on member 5. For example with reference to row 4, the HP information is stored at 4,4 followed by the diagonal parity information DP1 and DP2 stored at 4,5 and 4, 0, respectively Referring now to FIG. 5, shown is an example of the representation of FIG. 4 completed with the data segments, D, included therein. The example 300 illustrates the resulting arrangement of the data segments as well as the parity information included in each row striped across the different RAID group members. As an example, each cell of FIG. 5 corresponding to a data segment operated upon by the data layout techniques herein may be a single track of data. Each row may correspond to a stripe of data striped across all RAID group members. As described in connection with FIG. 3B, each row in FIG. 5 may correspond collectively to all data segments included in FIG. 3A for a stripe of data.

Figure 6:
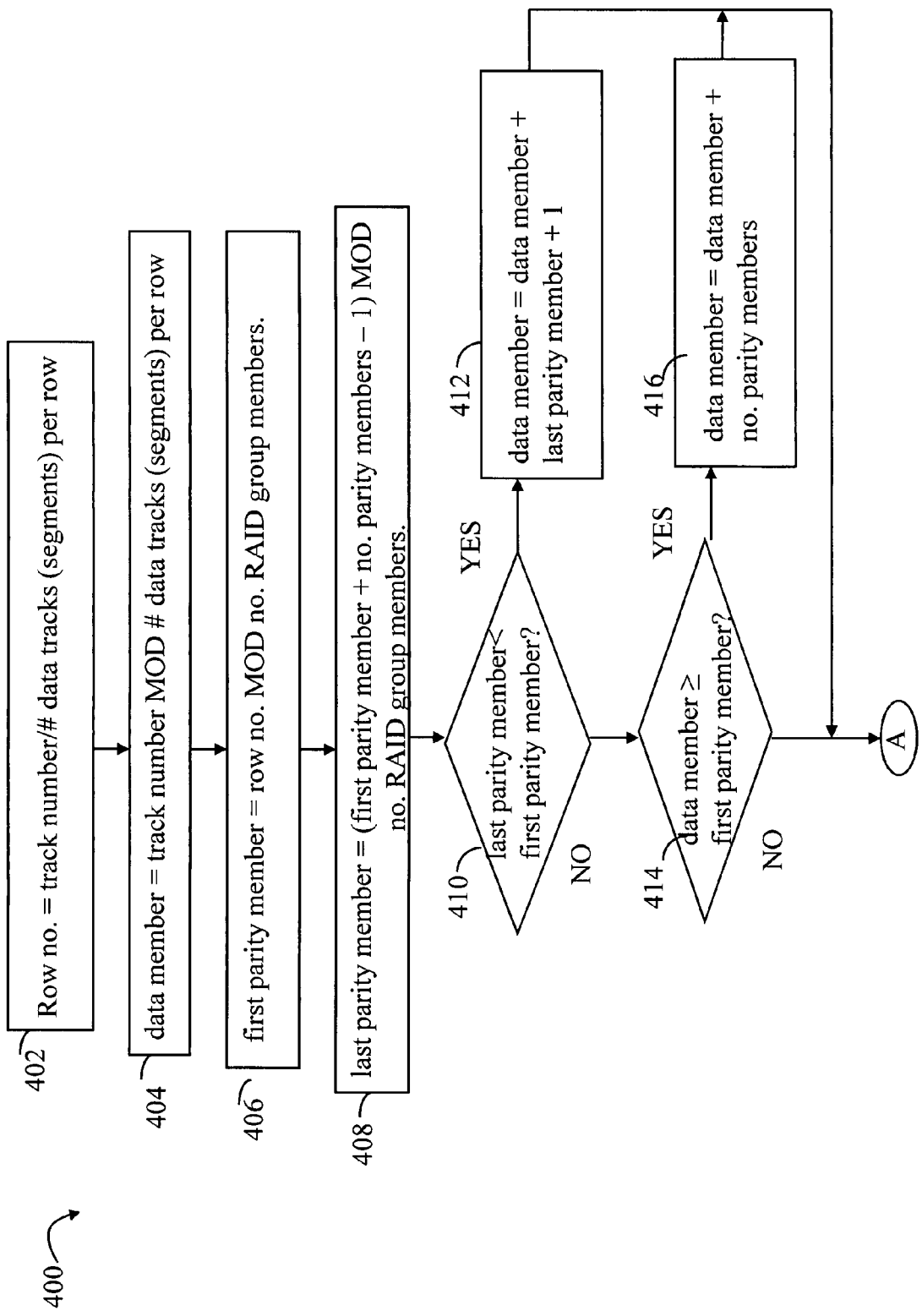
FIGS. 6 and 7 are flowcharts of processing steps for determining on what RAID group members to store a data segment and associated parity information.
Figure 7:
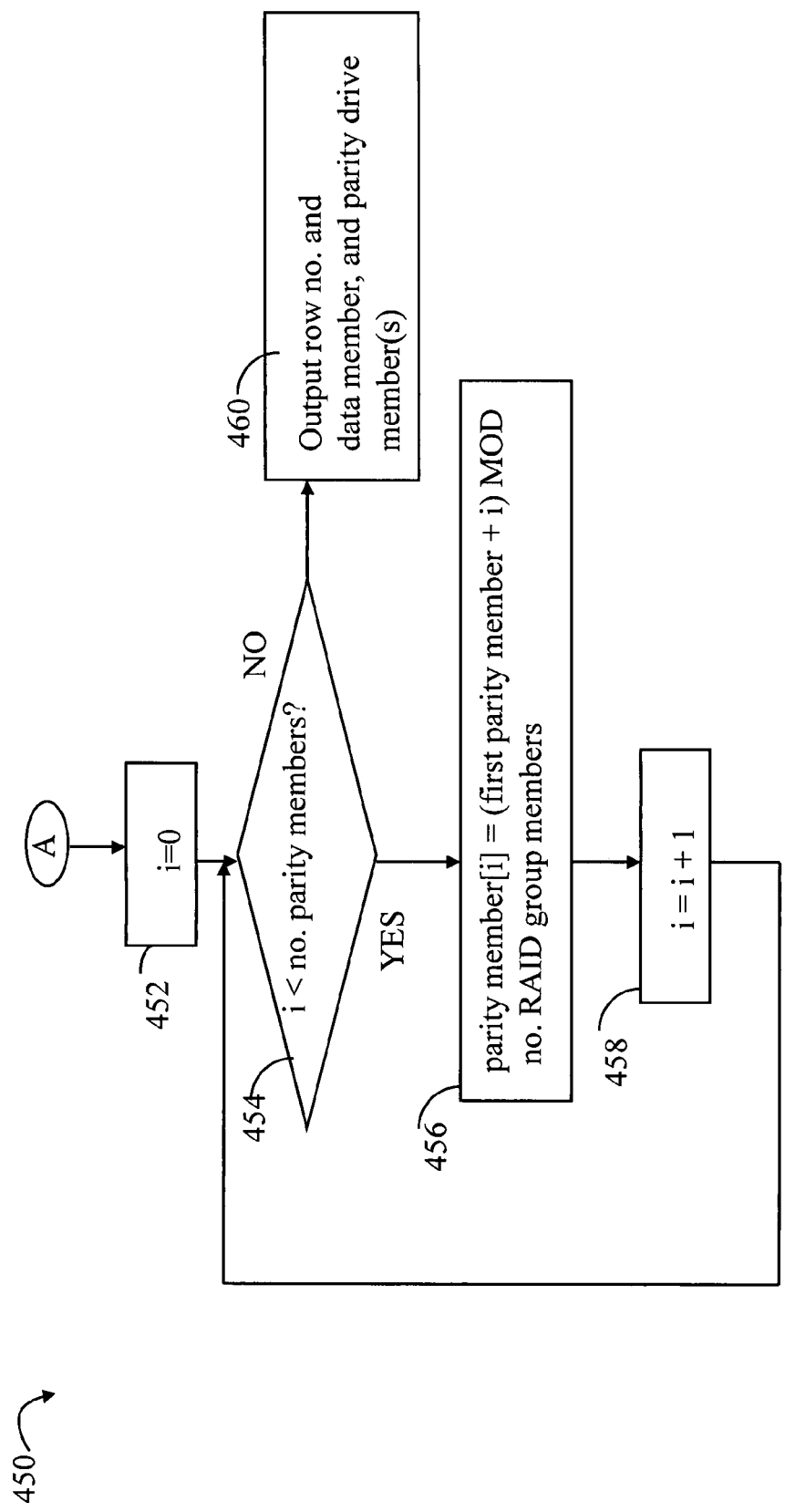

What will now be described in connection with FIGS. 6 and 7 is a technique used to determine the layout of the data and parity information as stored or striped on the different RAID group members. Performing the steps described in FIGS. 6 and 7 results in the arrangement of FIG. 5 for an embodiment having 6 RAID group members with 3 data members and 3 parity members.

Referring now to FIGS. 6 and 7, shown are flowcharts of processing steps that may be performed in order to determine a physical layout of data and parity information across RAID group members. The technique is generally written and may be used in connection with any RAID level and any number of RAID group members consisting of one or more parity members and one or more number of data members. The number of data members is greater than or equal to the number of parity members. The manner in which each parity member is formed may vary with the particular RAID protection technique used.

As described above, for purposes of illustration, each data segment is a single track. It will be appreciated by those skilled in the art that the general steps described herein may be modified for use with a stripe size or data segment size of other than a single track. The processing steps of FIGS. 6 and 7 determine, for a given data segment number or track number in this example, determine a row and column number representing a physical location in the RAID group as to where the data segment is stored. The row and column number identify, respectively, a stripe and associated RAID group member at which the data segment is stored. In connection with the general steps of FIGS. 6 and 7, reference is made for illustration to the example embodiment of FIGS. 3B, 4 and 5.

In step 402, the row or stripe number is determined. The row number is determined by dividing the track or data segment number by the number of data tracks or segments per row. The track or data segment number may be a zero-based number of the data segment, such as one of D0 . . . D17 of FIG. 5. The number of tracks or segments per row in connection with the previous example of FIG. 5 is 3. For segment D5, step 402 evaluates to 5/3 since there are 3 data segments in each row or stripe. For step 402, the row no. is assigned the resulting quotient=1.

At step 404, the variable data member is assigned the remainder result of the mathematical MOD (modulus) operation of track number (data segment number) divided by the number of data tracks or segments per row. For the segment D5, step 404 results in assigning data member=2. At step 406, the first parity member is determined as the row no. MOD the no. of RAID group members. For the segment D5, the no. of RAID group members is 6 and step 406 evaluates 1 MOD 6 so that first parity member=1. At step 408, the last parity member is determined as the (first parity member+no. parity members−1) MOD no. RAID group members. For the segment D5, the no. of parity members is 3 and the no. of RAID group members is 6 so that step 408 evaluates (1+3−1) MOD 6 resulting in last parity member=3. At step 410, a determination is made as to whether the last parity member is less than the first parity member. Step 410 is making a determination as to whether the parity information wraps around the RAID group members such as being stored on the last drive member and continuing on the first drive member 0 as illustrated, for example, in connection with rows 4 and 5 of FIG. 5. If step 410 evaluates to yes, control proceeds to step 412 where data member=data member+last parity member+1. From step 410, control proceeds to step 452.

If step 410 evaluates to no, control proceeds to step 414 to determine whether a current value of data member is greater than or equal to first parity member. If step 414 evaluates to no, control proceeds to step 452. If step 414 evaluates to yes, control proceeds to step 416 where data member is updated to be data member+no. of parity members. From step 416, control proceeds to step 452.

With reference to the example use of D5 above, data member=2, first parity member=1, and last parity member=3 so that step 410 evaluates to no and step 414 evaluates to yes causing data member to be updated to 5 (e.g., data member=2+3 (no. parity members in this example)).

At step 452, processing is performed to determine the parity members. A loop control variable, i, is used and initialized at step 452 to 0. At step 454, a determination is made as to whether i is less than the no. of parity members. If step 454 evaluates to yes, control proceeds to step 456 to determine the next parity member, parity member[i], calculated as (first parity member+i) MOD no. of RAID group members. Control proceeds to step 458 to increment i and continue with the next parity member calculation until step 454 evaluates to no. If step 454 evaluates to no, control proceeds to step 460 to output the row number or stripe number and data member and parity drive member(s).

With reference to D5 continuing with the previous example described above, the number of parity members is 3 (HP, DP1 and DP2). Processing of flowchart 450 results in determining RAID group drives or members 1, 2, and 3 as including the parity information for the track of data segment 5 stored at location 1, 5, wherein 1 is the row or stripe number and 5 is the data member in a zero-based configuration for stripe numbers and RAID group members. The parity information is stored on the RAID group members in the same stripe or row as the data segment.

In connection with the foregoing description of FIGS. 6 and 7, a simplification was made for purposes of illustration of the techniques herein in that each data segment (D) or parity segment (HP, DP1, or DP2) written at a time on a RAID group member is described as a single track. In actual implementation, each segment written may be a different or varying number of units, such as 4 tracks. Furthermore, rather than receiving as input the track number in connection with FIGS. 6 and 7 processing, a head and cylinder number of a disk drive may be utilized. In such an embodiment, the head and cylinder number may be converted to a track number. In view of the foregoing, the calculations of steps 402 and 404 of FIG. 6 may be represented as follows:

Determine track number for a given head and cylinder number;

Row no. (or stripe number)=track number/number of tracks per stripe or row

Data member=(track number MOD number of tracks per stripe or row)/size of each data segment or portion written to each RAID group member (e.g., number of tracks per segment).

The foregoing of FIGS. 6 and 7 may be characterized as a generic function for striping which calculates the physical data and parity member ownership for a given logical data segment in a RAID group. The foregoing of FIGS. 6 and 7 may be used in connection with any RAID-level such as, for example, RAID-1 as well as RAID-5 and RAID-6. For a given RAID level, any number and configuration of RAID group members may be specified. For example, the techniques of FIGS. 6 and 7 may be used with determining where to store data and parity information for a data segment in a RAID group configuration having 6 members, 3 of which are data members and 3 of which are parity members. The techniques of FIGS. 6 and 7 may also be used in a RAID group configuration having 6 members with 5 data members and 1 parity member, as well as a configuration of 6 members with 4 data members and 2 parity members.

A function, stripe, may be implemented using the techniques of FIGS. 6 and 7 represented as follows:

stripe(cylinder, head)=stripe or row number, data member, one or more parity members in which the cylinder and head numbers are provided as input parameters "cylinder" and "head" and the stripe function outputs the items appearing on the right hand side of the "=" above.

As a complementary function, an unstriping function may be included in an embodiment which determines a given data segment stored at a location specified as a stripe or row number and a data member. In such a generic unstriping function, the inputs may be the location (e.g., stripe or row number and data member). The unstriping function may return as an output the data segment (Dn) stored at that location.

Figure 8:
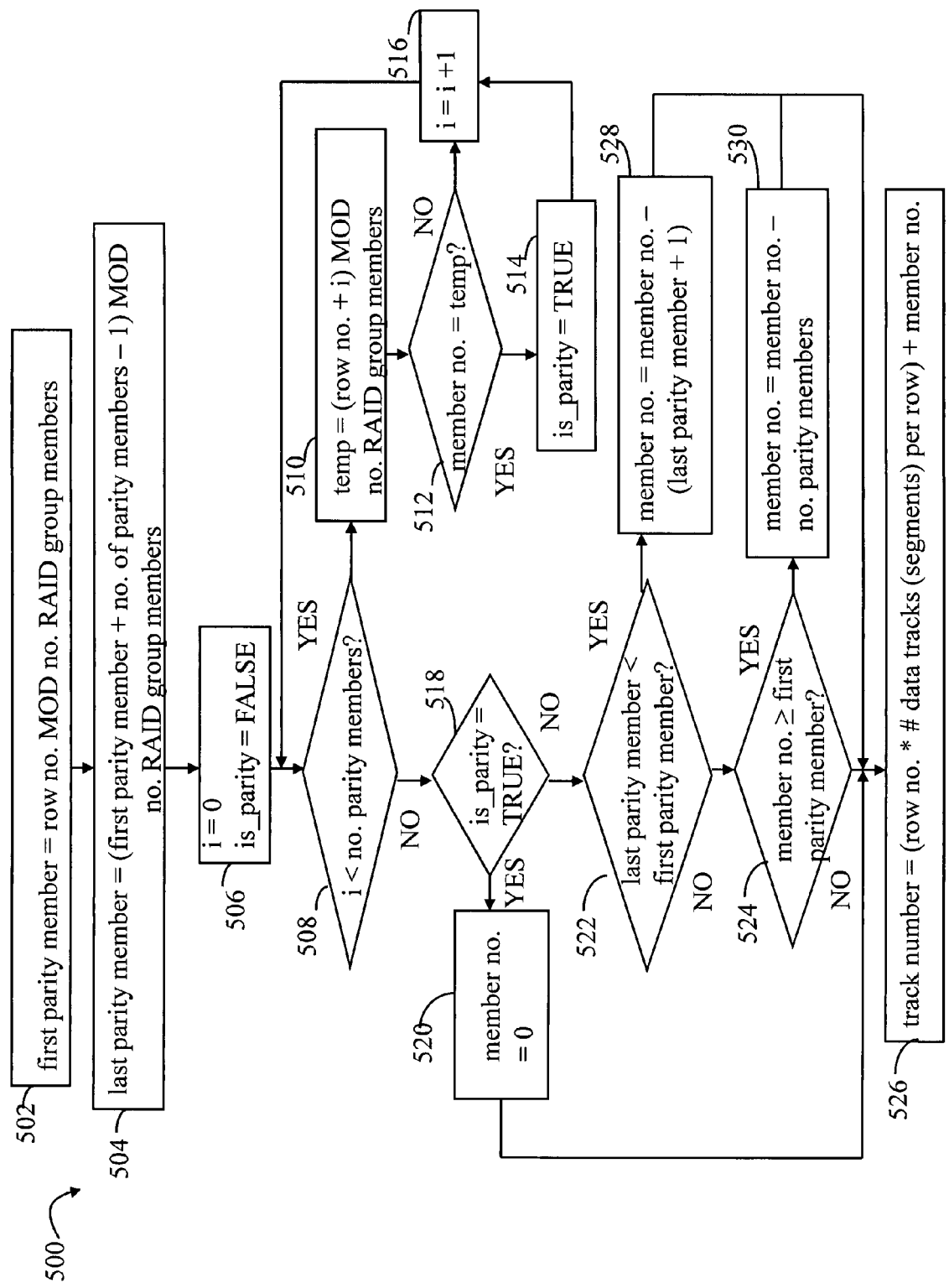
FIG. 8 is a flowchart of processing steps for determining what data segment is stored at a particular location on a RAID group member.

Referring now to FIG. 8, shown is a flowchart of processing steps that may be performed in an embodiment in order to determine a particular data segment stored at a physical location identified by a stripe or row number (e.g., "row no.") and a data member ("member no." or "member number"). For purposes of simplification in illustrating the techniques herein as set forth in connection with FIGS. 6 and 7 above, each data segment may be a single track. The processing of flowchart 500 determines the data segment (Dn) stored at the specified location. In the event that parity information (e.g., HP, DP1 or DP2) is stored at the specified location, the processing of 500 returns the first data segment in that row or stripe. It should be noted that an embodiment may also return another default value in the event that parity information is stored at the specified location.

At step 502, the first parity member is determined by calculating the row or stripe number (e.g., row no.) MOD the total number of RAID group members. At step 504, the last parity member is determined by calculating the (first parity member+number of parity members−1) MOD total number of RAID group members. At step 506, variables are initialized for use in subsequent processing steps. The variable i is initialized to zero and the boolean is parity is initialized to FALSE. At step 508, a determination is made as to whether the current value of i is less than the number of parity members in the RAID group. If so, control proceeds to step 510 where a variable temp is assigned (row or strip number+i) MOD total number of RAID group members. At step 512, a determination is made as to whether the variable member no. or member number is equal to temp. Member no. is the member number specified as one of the input values associated with the location. If step 512 evaluates to no, control proceeds to step 516 where i is incremented by 1 and processing continues with step 508. If step 512 evaluates to yes, control proceeds to step 514 where the boolean is parity is assigned the value TRUE and control proceeds to step 516.

The processing of step 510, 512, 514 and 516 are making a determination as to whether the input variable, member no., specifies a member of the RAID group at which parity information is stored. If so, the variable is parity is set to TRUE.

If step 508 evaluates to no, control proceeds to step 518 to make a determination as to whether is parity is TRUE. If so, control proceeds to step 520 and member no. is assigned the value of 0 and processing continues with step 526. If step 518 evaluates to no, control proceeds to step 522 where a determination is made as to whether the last parity member is less than the first parity member. If step 522 evaluates to yes, control proceeds to step 528 where member no. is assigned member no.—(last parity member+1) and processing continues with step 526. If step 522 evaluates to no, control proceeds to step 524 where a determination is made as to whether member no. is greater than or equal to first parity member. If step 524 evaluates to yes, control proceeds to step 530 where member no. is updated to be member no.—no. of parity members and processing continues with step 526. If step 524 evaluates to no, control proceeds to step 526. At step 526, the track number is determined as (row no.*number of data tracks or segments per stripe (e.g., row))+member no. The track number variable of step 526 identifies the particular data segment number stored at the location specified by row or stripe no. and member no.

Consider an example of FIG. 8 processing with reference to FIG. 5 to identify the particular data segment, Dn, stored at the location 4, 2, or stripe/row no. 4, on the second RAID group member drive. Step 502 determines the first parity member as 4. Step 504 determines the last parity member as 0. Processing of steps 508, 510, 512, 514 and 516 result in is parity being FALSE so that step 518 evaluates to no. Step 522 evaluates to yes and control proceeds to step 528 where member no.=2−(0+1)=3. Control proceeds to step 526 where track number=(4*3)+2=14 identifying D14.

As described above in connection with FIGS. 6 and 7, in the processing of FIG. 8, a simplification was made for purposes of illustration of the techniques herein in that each data segment (D) or parity segment (HP, DP1, or DP2) written at a time on a RAID group member is described as a single track. In actual implementation, each segment written and operated upon using the data layout techniques herein may be a different or varying number of units. For example, the size of a stripe unit may be 4 tracks rather than a single track. In one embodiment, the inputs to processing of FIG. 8 may be a RAID group member number and a slice number or track number if each slice is a track. In such an embodiment in which each slice is a track, processing may include performing an additional step prior to step 502 to determine the row number of a data track as:

row no.=track number/number of tracks (e.g., slices) per row (or stripe)

If there are a number of slices or tracks in each data segment operated upon by the layout technique described herein, the calculations of step 526 may be modified as follows in which each slice is a track:

track number=(row no.*#data tracks per row (or stripe))+(track number (e.g., slice no.) MOD number of tracks in each data segment)+member no.*number of tracks in each data segment where "number of tracks in each data segment" represents a size in number of tracks of each portion written at a time to a RAID device member and as operated upon using the data layout techniques herein. With reference to FIG. 5, for example, the foregoing size may refer to the size of each data segment (Dn) and each parity segment (HP, DP1, or DP2) of information.

In an embodiment, the foregoing track number may also be mapped to a cylinder and head number so that additional processing may be performed after step 526 to determine a cylinder and head number for a given track number determined at step 526.

FIG. 8 describes processing steps of a generic unstriping function that may be used in connection with any RAID level having parity information with a varying number of total RAID group members as well as a varying number of data and parity members as described elsewhere herein.

The foregoing processing described herein for determining a data layout for RAID group devices and the associated functions, such as the striping and unstriping functions, may be performed by code executed by a processor such as, for example, included in the data storage system, a computer system, or other system or component. The code may be stored on a form of computer readable medium such as, for example, a data storage device as described herein as well as others known in the art.

Figure 9:
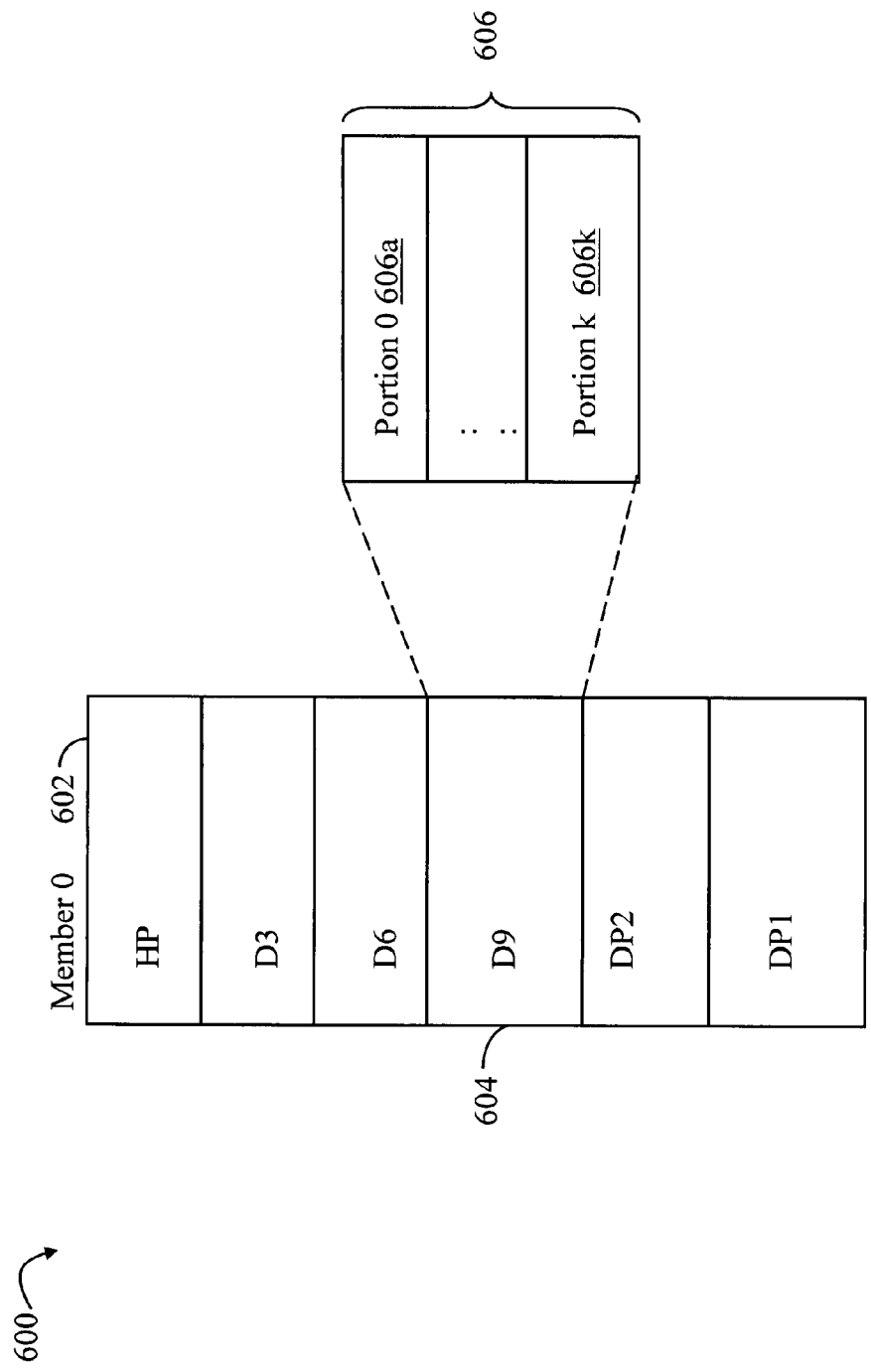
FIG. 9 is an example illustrating the data included in each segment written to a RAID group member.

Referring now to FIG. 9, shown is an example illustrating the data included in each segment written to a RAID group member. The example 600 includes the segments stored on RAID group member 0 as illustrated in FIG. 5. Each of the segments of data or parity information in 602 may be included in a different slice or stripe of data. The size of each data segment in 602 may be a single track of data as described herein for exemplary purposes of illustration and simplification. Each segment, such as 604, illustrates a unit of data as operated upon with the data layout technique herein and written at a point in time to a RAID group member. Each segment of data and parity information may correspond to a stripe unit or size of an amount of data written at a time to each RAID group member. Each segment, such as D9 604, may include one or portions 606a-606k of information 606. In an embodiment, each segment 604 may be partitioned into k portions in which each of the k portions corresponds to a unit of data as operated upon using the RAID technique generating the parity information encoded, for example, in HP, DP2 and DP1.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining where to store data and parity information in a RAID group for a data track having a track number comprising:
   providing a stripe number including said data track, said stripe number corresponding to a row of segments written to members of said RAID group, said row of segments including data and parity information, each of said members of said RAID group associated with a different member identifier;
   determining a first member identifier of a first member of said RAID group as a quotient of two elements, a first of said two elements being a remainder of said track number divided by a number of tracks in each stripe and a second of said two elements being a size of each of said segments, said first member identifying a RAID group member at which data information of said data track is stored;
   determining a second member identifier of a second member of said RAID group to store a first set of parity information for said data track, said second member identifier determined as a remainder of said stripe number divided by a number of members in said RAID group;
   determining a third member identifier of a third member of said RAID group to store a last set of parity information for said data track, said third member identifier being determined as a remainder of a sum divided by said number of members in said RAID group, said sum is a result of said second member and a number of parity members in said RAID group minus a value of one;
   determining whether said third member identifier is less than said second member identifier; and
   if said third member identifier is less than said second member identifier, updating said first member identifier to be a sum of a current value of said first member identifier, said third member identifier, and a value of one.

2. The method of claim 1, wherein if said third member is not less than said second member, the method further comprising:
   determining whether said first member identifier is greater than or equal to said second member identifier; and
   if said first member identifier is greater than or equal to said second member identifier, updating said first member identifier to be a sum of a current value of said first member identifier and said number of parity members in said RAID group.

3. The method of claim 1, wherein said stripe number is determined as a quotient of said track number divided by the number of tracks in each stripe.

4. The method of claim 1, wherein said RAID group includes "m" parity members, m>1, and the method includes:
   storing a first set of parity information for said data track on said second member;
   storing a last set of parity information for said data track on said third member.

5. The method of claim 4, wherein, if m>2, storing other parity information for said data track on members having an associated member number which is between said second member and said third member.

6. The method of claim 1, wherein said RAID group includes 1 parity member and said second member identifier is equal to said third member identifier.

7. The method of claim 1, wherein if said third member identifier is less than said second member identifier and the number of parity members in the RAID group is more than 1, parity information for said data track is stored on a last member of said RAID group having a highest value of all member identifiers associated with the members of the RAID group, and other parity information is stored on another member of said RAID group have a smallest value of all said member identifiers.

8. The method of claim 1, further comprising:
   providing a cylinder number and head number associated with a data storage device; and
   determining said track number for said cylinder number and head number.

9. A method for determining a track identifier of a data track stored at a location in a RAID group comprising:
   providing said location, said location including a member identifier identifying a member drive of said RAID group and a stripe number, each of said members of said RAID group associated with a different member identifier, said stripe number corresponding to a row of segments written to members of said RAID group, said row of segments including data and parity information;
   determining a first member identifier of a first member of said RAID group at which a first set of parity information for said data track is stored, said first member identifier determined as a remainder of said stripe number divided by a number of members in said RAID group;

determining a second member identifier of a second member of said RAID group at which a last set of parity information for said data track is stored, said second member identifier being determined as a remainder of a first quantity divided by said number of members in said RAID group, said first quantity is a result of said first member identifier and a number of parity members in said RAID group minus a value of one;

determining whether the second member identifier is less than said first member identifier;

providing a track identifier initialized to said member identifier;

if said second member identifier is less than said first member identifier, updating said track identifier as said member identifier minus a sum of said second member identifier and a value of one; and updating said track identifier as a sum of elements, said elements including a first element as a product of said stripe number and a number of data tracks in each row of segments written to members of said RAID group, and a second element as said track identifier adjusted for a size of each of said segments.

10. The method of claim 9, wherein, if said second member identifier is not less than said first member identifier, the method further comprises performing, prior to said updating said track identifier as a sum of elements:

determining whether said member identifier is greater than or equal to said first member identifier and, if so, updating said track identifier as said member identifier minus a number of parity members in said RAID group.

11. The method of claim 9, wherein said sum of elements includes a third element determined as a remainder of a current value of said track identifier divided by a number of tracks in each of said segments.

12. The method of claim 9, further comprising:

determining whether said data track is stored on a member of said RAID group including parity information and, if so, updating said track identifier to identify a default data track included in a data segment of said stripe number.

13. The method of claim 9, wherein said stripe number is determined as a quotient of a slice number and a number of slices in each row of segments written members of said RAID group, each slice corresponding to one or more tracks of a data storage device.

14. The method of claim 9, further comprising:

determining a cylinder number and head number associated with a data storage device for said track identifier.

15. A computer readable medium comprising executable code stored thereon for determining where to store data and parity information in a RAID group for a data track having a track number, the computer readable medium comprising executable code for:

providing a stripe number including said data track, said stripe number corresponding to a row of segments written to members of said RAID group, said row of segments including data and parity information, each of said members of said RAID group associated with a different member identifier;

determining a first member identifier of a first member of said RAID group as a quotient of two elements, a first of said two elements being a remainder of said track number divided by a number of tracks in each stripe and a second of said two elements being a size of each of said segments, said first member identifying a RAID group member at which data information of said data track is stored;

determining a second member identifier of a second member of said RAID group to store a first set of parity information for said data track, said second member identifier determined as a remainder of said stripe number divided by a number of members in said RAID group;

determining a third member identifier of a third member of said RAID group to store a last set of parity information for said data track, said third member identifier being determined as a remainder of a sum divided by said number of members in said RAID group, said sum is a result of said second member and a number of parity members in said RAID group minus a value of one;

determining whether said third member identifier is less than said second member identifier; and if said third member identifier is less than said second member identifier, updating said first member identifier to be a sum of a current value of said first member identifier, said third member identifier, and a value of one.

16. The computer readable medium of claim 15, further comprising executable code that, if said third member is not less than said second member:

determines whether said first member identifier is greater than or equal to said second member identifier; and if said first member identifier is greater than or equal to said second member identifier, updates said first member identifier to be a sum of a current value of said first member identifier and said number of parity members in said RAID group.

17. The computer readable medium of claim 15, wherein said stripe number is determined as a quotient of said track number divided by the number of tracks in each stripe.

18. The computer readable medium of claim 15, wherein said RAID group includes "m" parity members, m>1, and the computer readable medium further includes executable code for:

storing a first set of parity information for said data track on said second member;

storing a last set of parity information for said data track on said third member.

19. The computer readable medium of claim 18, wherein, the computer readable medium further comprising executable code that, if m>2, stores other parity information for said data track on members having an associated member number which is between said second member and said third member.

20. The computer readable medium of claim 15, wherein said RAID group includes 1 parity member and said second member identifier is equal to said third member identifier.

* * * * *